(12) United States Patent
Draeger (10) Patent No.: US 11,596,141 B1
(45) Date of Patent: Mar. 7, 2023

(54) MOTORIZED TWO-PIECE HEAD FOR OWL (71) Applicant: Dalen Products, Inc., Knoxville, TN (US)

(72) Inventor: William M. Draeger, Sevierville, TN (US)

(73) Assignee: Dalen Products, Inc.

( * ) Notice: Subject to any disclaimer, the term of this patent is extended or adjusted under 35 U.S.C. 154(b) by 178 days.

(21) Appl. No.: 17/126,140

(22) Filed: Dec. 18, 2020

Related U.S. Application Data

(63) Continuation-in-part of application No. 16/445,714, filed on Jun. 19, 2019, now Pat. No. 11,311,007.

(51) Int. Cl.
*A01M 29/06* (2011.01)
*H02S 10/40* (2014.01)
*H02K 11/30* (2016.01)
*H02K 11/00* (2016.01)
*H02K 11/21* (2016.01)
*H02S 40/38* (2014.01)

(52) U.S. Cl.
CPC ......... *A01M 29/06* (2013.01); *H02K 11/0094* (2013.01); *H02K 11/21* (2016.01); *H02K 11/30* (2016.01); *H02S 10/40* (2014.12); *H02S 40/38* (2014.12)

(58) Field of Classification Search
CPC ....... A01M 29/06; A01M 29/00; F16C 11/04; H02K 11/21; H02K 11/30
USPC ...................................................... 43/1, 2, 3
See application file for complete search history.

(56) References Cited

U.S. PATENT DOCUMENTS

| | | | |
|---|---|---|---|
| 7,246,569 B2 | 7/2007 | Grandy et al. | |
| 7,411,504 B2 | 8/2008 | Hanscom | |
| 8,997,697 B1 | 4/2015 | Dailey | |
| 9,072,288 B1 | 7/2015 | Thomas | |
| 2020/0323194 A1* | 10/2020 | Li | G01S 13/88 |

FOREIGN PATENT DOCUMENTS

| | | |
|---|---|---|
| GB | 2465150 A | 5/2010 |
| GB | 2531059 B | 4/2019 |
| WO | 2016108069 A1 | 7/2016 |

* cited by examiner

*Primary Examiner* — Joshua J Michener
*Assistant Examiner* — Nicole Paige MacCrate
(74) *Attorney, Agent, or Firm* — Luedeka Neely Group, PC (57) ABSTRACT

A scarecrow includes a scarecrow body corresponding generally in shape to a body of a live animal and an assembled hollow scarecrow head of molded plastic construction corresponding in shape to a head of the live animal. The assembled head includes a front face portion and a separate rear head portion fixed together to form the head, the front face portion having a front receiver and the rear head portion having a rear receiver. The scarecrow includes a motor having a rotatable motor shaft; a mounting insert fixed to the motor with the motor shaft extending below the mounting insert, the mounting insert received by the front receiver and the rear receiver to fix the mounting insert to the head; and a mounting bracket fixed to the scarecrow body and having a motor shaft receiver into which the rotatable motor shaft is received. Rotation of the motor shaft rotates the assembled scarecrow head relative to the scarecrow body.

13 Claims, 10 Drawing Sheets

MOTORIZED TWO-PIECE HEAD FOR OWL

FIELD

This disclosure relates to the field of scarecrows and particularly plastic owls having movable heads. More particularly, the disclosure relates to a scarecrow having a motorized two-piece head that rotates the head relative to a body of the scarecrow to mimic head movements of a live owl, and methods for assembling scarecrows.

BACKGROUND

Improvement is desired in the structure and assembly of scarecrow devices and the like of the type having a head that moves relative to a body under motorized movement. In particular, it is desirable to provide a scarecrow that has movement, and especially a scarecrow that can sense motion proximate the scarecrow and move when such motion is sensed.

The present disclosure advantageously provides improved scarecrow structures for incorporating a motor into a head which simplify assembly and result in other product improvements.

In one embodiment, a scarecrow owl is provided having a motorized head that senses motion proximate the scarecrow. When such motion is sensed, the motor is operated to rotate the head back and forth for a short time duration to mimic the head movements of a live owl. The head movement is continued as long as movement proximate the scarecrow is sensed. This advantageously provides a scarecrow that more realistically mimics the presence of a live owl to provide a more effective scarecrow device.

SUMMARY

The above and other needs are met by a scarecrow having a motorized movable head and methods for assembling scarecrows.

In one aspect, a scarecrow according to the disclosure includes a scarecrow body corresponding generally in shape to a body of a live animal and an assembled hollow scarecrow head of molded plastic construction corresponding in shape to a head of the live animal. The assembled head includes a front face portion and a separate rear head portion fixed together to form the head, the front face portion having a front receiver and the rear head portion having a rear receiver. The scarecrow includes a motor having a rotatable motor shaft; a mounting insert fixed to the motor with the motor shaft extending below the mounting insert, the mounting insert received by the front receiver and the rear receiver to fix the mounting insert to the head; and a mounting bracket fixed to the scarecrow body and having a motor shaft receiver into which the rotatable motor shaft is received. Rotation of the motor shaft rotates the assembled scarecrow head relative to the scarecrow body.

In another aspect, a scarecrow according to the disclosure includes a scarecrow body corresponding generally in shape to a body of a live animal and an assembled head of molded plastic construction corresponding in shape to a head of the live animal. The assembled head includes a front face portion and a rear head portion press-fit together, the front face portion having a front receiver and the rear head portion having a rear receiver. The scarecrow also includes a motor having a rotatable motor shaft and a mounting insert fixed to the motor with the motor shaft extending below the mounting insert. The mounting insert is received by the front receiver and the rear receiver to fix the mounting insert to the head.

In a further aspect, the disclosure provides a method for assembling a scarecrow, including the steps of providing a front face portion and a rear head portion of a scarecrow head, the front face portion having a front receiver and the rear head portion having a rear receiver; providing a motor assembly having a motor with a rotatable motor shaft and a mounting insert fixed to the motor with the motor shaft extending below the mounting insert; installing the mounting insert onto either the front receiver or the rear receiver; and fitting the front face portion and the rear head portion together.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
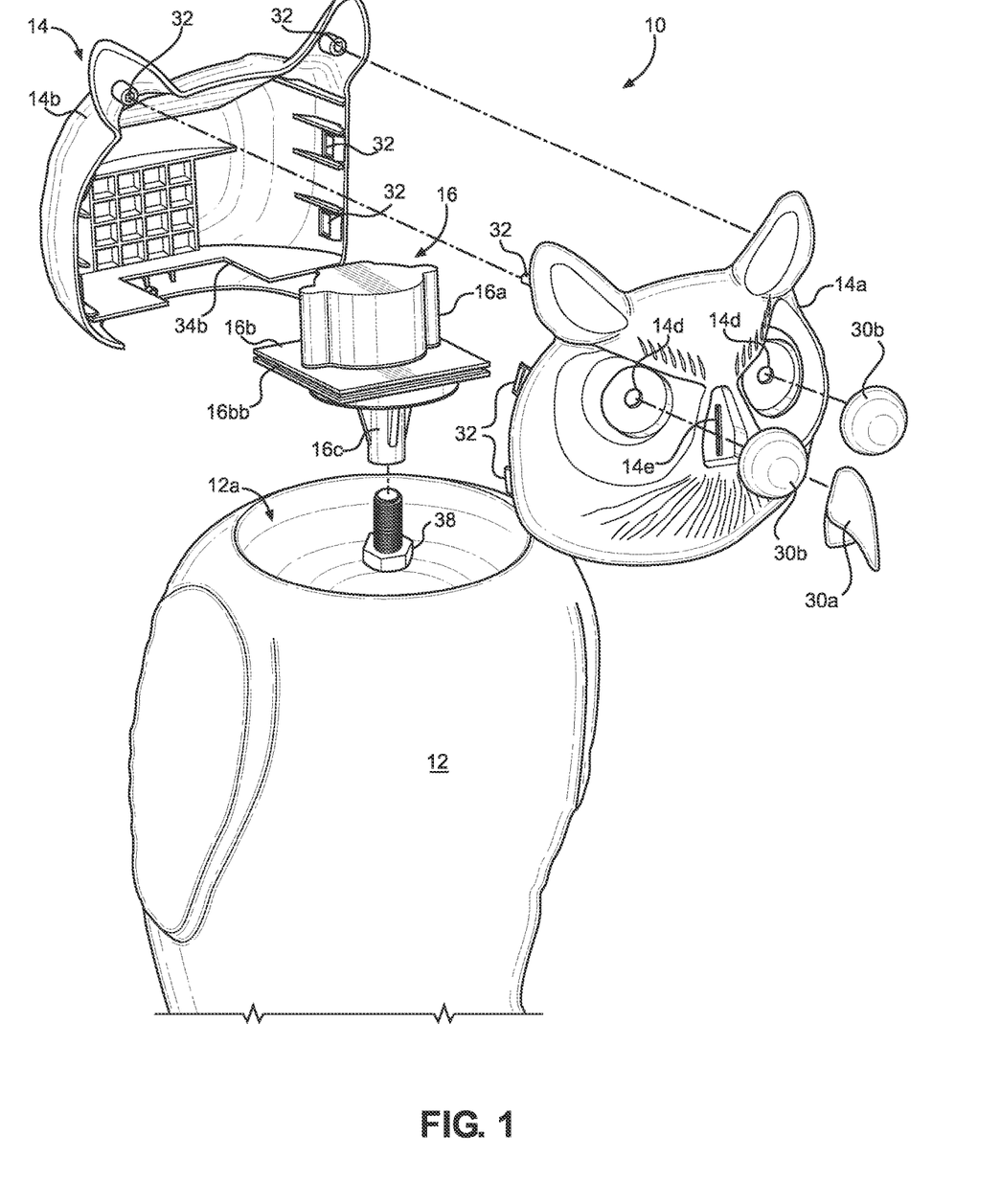
FIG. 1 is an exploded perspective view of a scarecrow with a motorized two-piece head according to the disclosure.

With initial reference to FIG. 1, there is shown a scarecrow 10 having a scarecrow body 12 and a head 14 mounted for motorized movement relative to the body 12. The scarecrow 10 is configured as a great-horned owl, but it will be appreciated that scarecrows according to the disclosure may be configured as other birds and other animals, preferably predator animals such as hawks or cats. However, if desired for novelty or entertainment purposes of a moving body and a moving body part, with the moving body part configured of two-piece construction as described herein.

A motor assembly 16 is installed inside the head 14 and supported by the scarecrow body 12 to enable motorized movement of the head 14 relative to the body 12. The motor assembly includes a motor 16a, a mounting insert 16b, and a mounting bracket 16c.

Figure 10A:
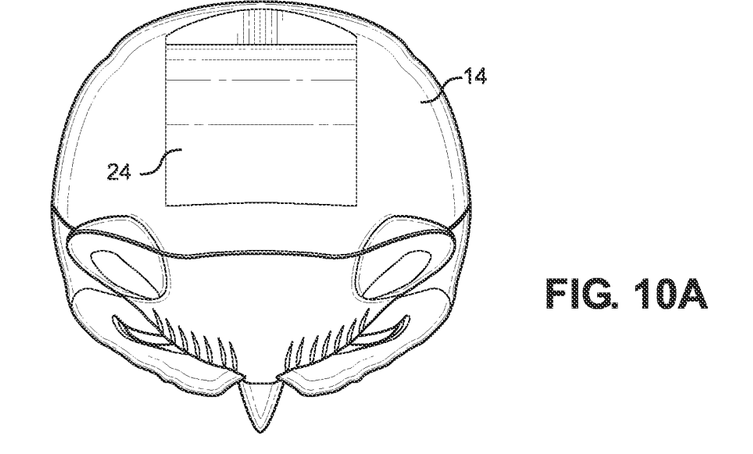
Figure 10B:
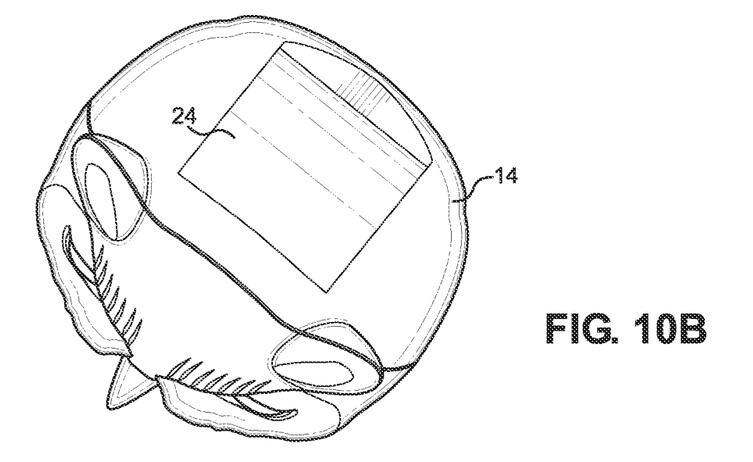
Figure 10C:
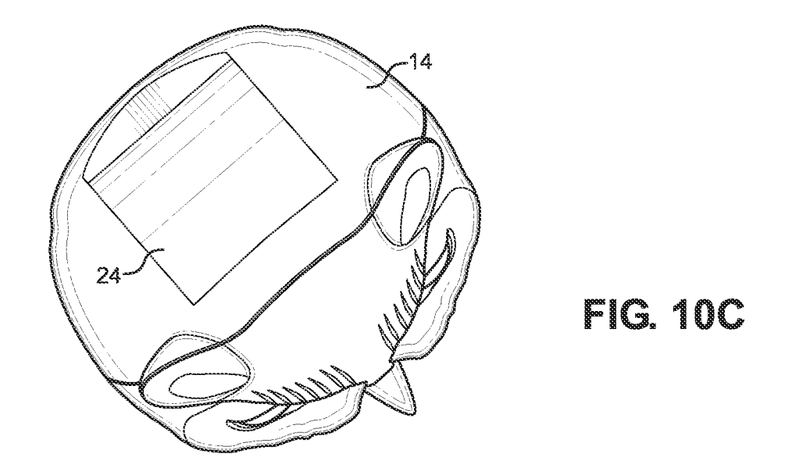

The motor 16a is preferably a direct current motor controlled by an electronic circuit 18 having a motion sensor 20. The electronic circuit 18 is connected to the motor 16a as by a wire 18a. The electronic circuit 18 and the motor 16a are powered as by a battery 22. The battery 20 is charged as by a solar panel 24 that may be mounted on the head 14 (FIG. 10A).

The body 12 corresponds to the body of the owl replicas described in U.S. Pat. No. 5,901,491, entitled "Owl With Movable Head," issued May 11, 1999, U.S. Pat. No. 7,966,963, entitled "Owl With Intermittent Powered Movement," issued Jun. 28, 2011, and U.S. Pat. No. 8,171,875, entitled "Owl With Intermittent Powered Movement," issued May 8, 2012, each incorporated by reference herein in its entirety. In this regard, the body 12 externally resembles the shape and appearance of the body of a live owl. The body 12 includes a concave upper surface 12a to receive a lower portion of the head 14 so that the head 14 is countersunk into the body 12 to enhance the realistic appearance of the replica and to avoid diminishment of this appearance during movement of the head 14.

The head 14 is provided by a front face portion 14a and a rear head portion 14b that assemble and matingly engage one another to provide the head 14. The head 14 in the assembled state corresponds externally in shape to the head of a live owl. The assembled head 14 is generally hollow and globe-shaped. The assembled head 14 has an aperture 14c adjacent the lower portion of the head 14. A plastic mouth or beak 30a and plastic eyes 30b are installed into corresponding receivers 14d and 14e, respectively, formed on the front face portion 14a. The front face portion 14a advantageously provides a structure that has a flattened profile and this profile facilitates automated insertion of the beak 30a and eyes 30b. The automated insertion of beak 30a and eyes 30b is difficult with a one-piece head and is generally done by hand. It will be appreciated that the beak and the eyes may be formed with the front face portion 14a during molding, but, the realistic appearance of separately molded mouths/beaks and eyes is generally better.

The front face portion 14a and the rear head portion 14b have cooperating snap or press fit connectors 32 that matingly engage one another in press or snap fit relationships to facilitate tool-less assembly of the head 14. One advantage of the two-piece molded head design includes a significant reduction in the labor and ease of installation of the motor assembly 16.

Figure 2:
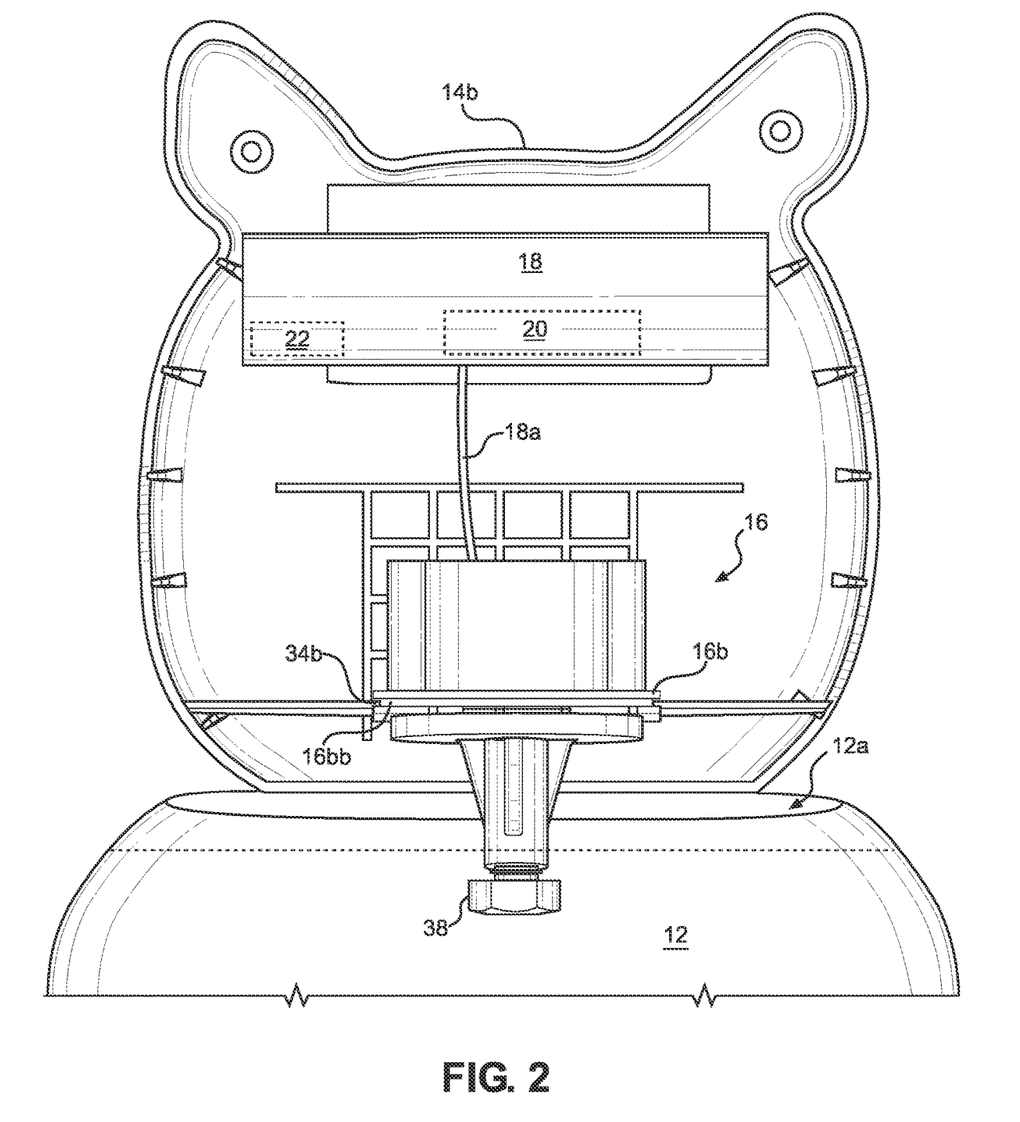
FIG. 2 is a closeup view showing installation of a motor assembly onto a rear head portion.
Figure 3:
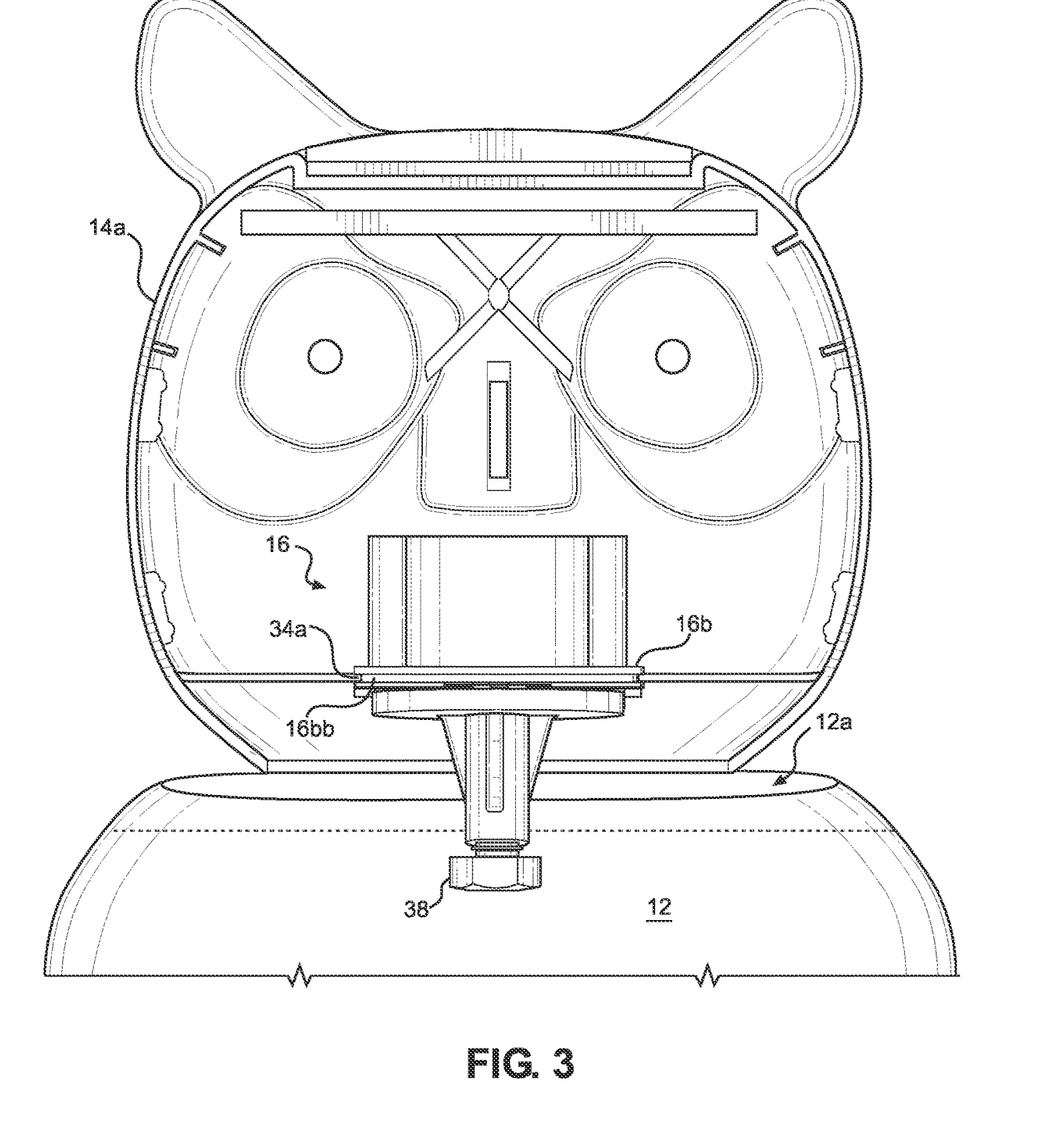
FIG. 3 is a closeup view showing installation of the motor assembly onto a front head portion.
Figure 4:
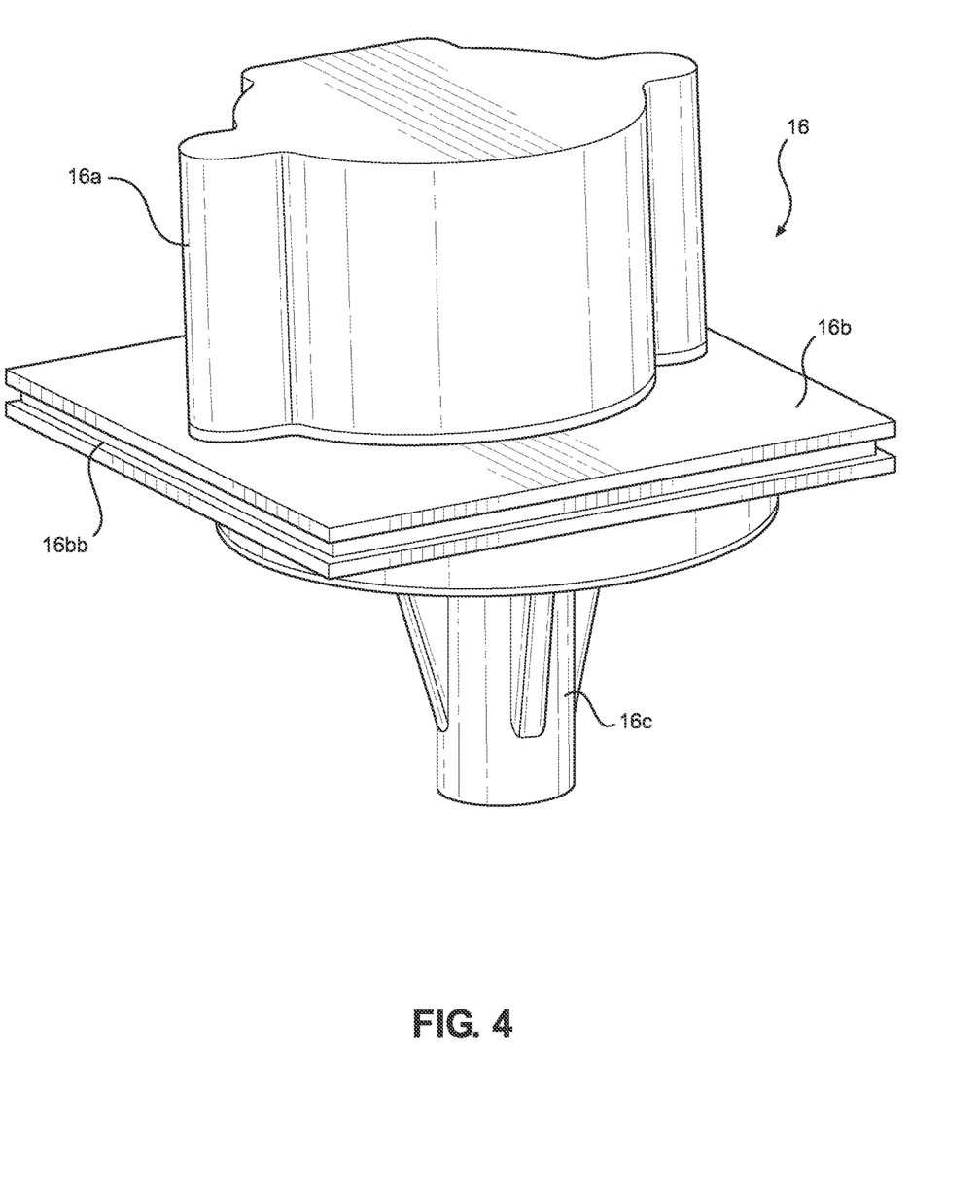
FIGS. 4 and 5 are assembled views of the motor assembly.
Figure 5:
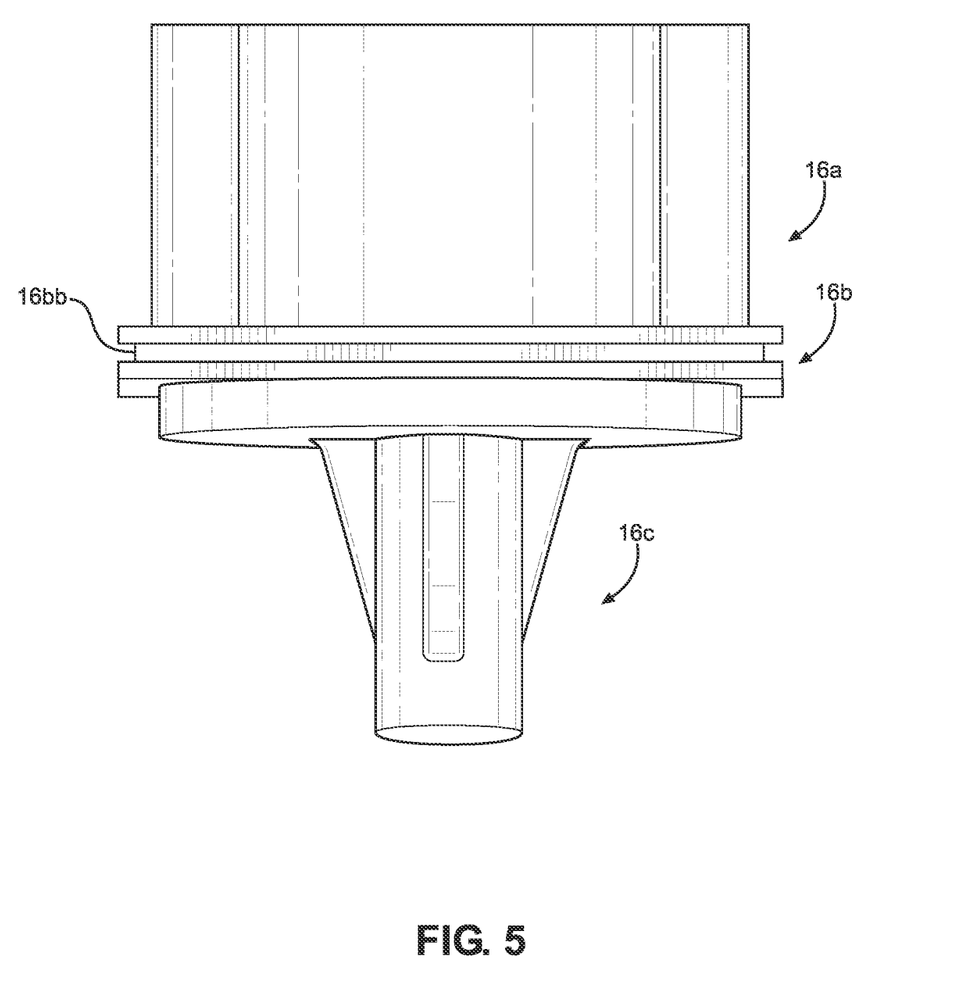

For example, as shown in FIGS. 2 and 3, the motor 16a is connected to the mounting insert 16b, and this assembly is secured to the rear head portion 14b by pressing the mounting insert 16b into a receiver 34b formed on the rear head portion 14b configured to receive a slotted or recessed edge 16bb of the mounting insert 16b. The front face portion 14a has a corresponding receiver 34a for receiving the recessed edge 16bb of the mounting insert 16b, and the front face portion 14a may be press-fit onto the rear head portion 14b which greatly simplifies installation of the motor 16a and the mounting insert 16b into the head 14. In this regard, it will be observed that the recessed edge 16bb surrounds the circumference of the insert 16b.

Figure 6:
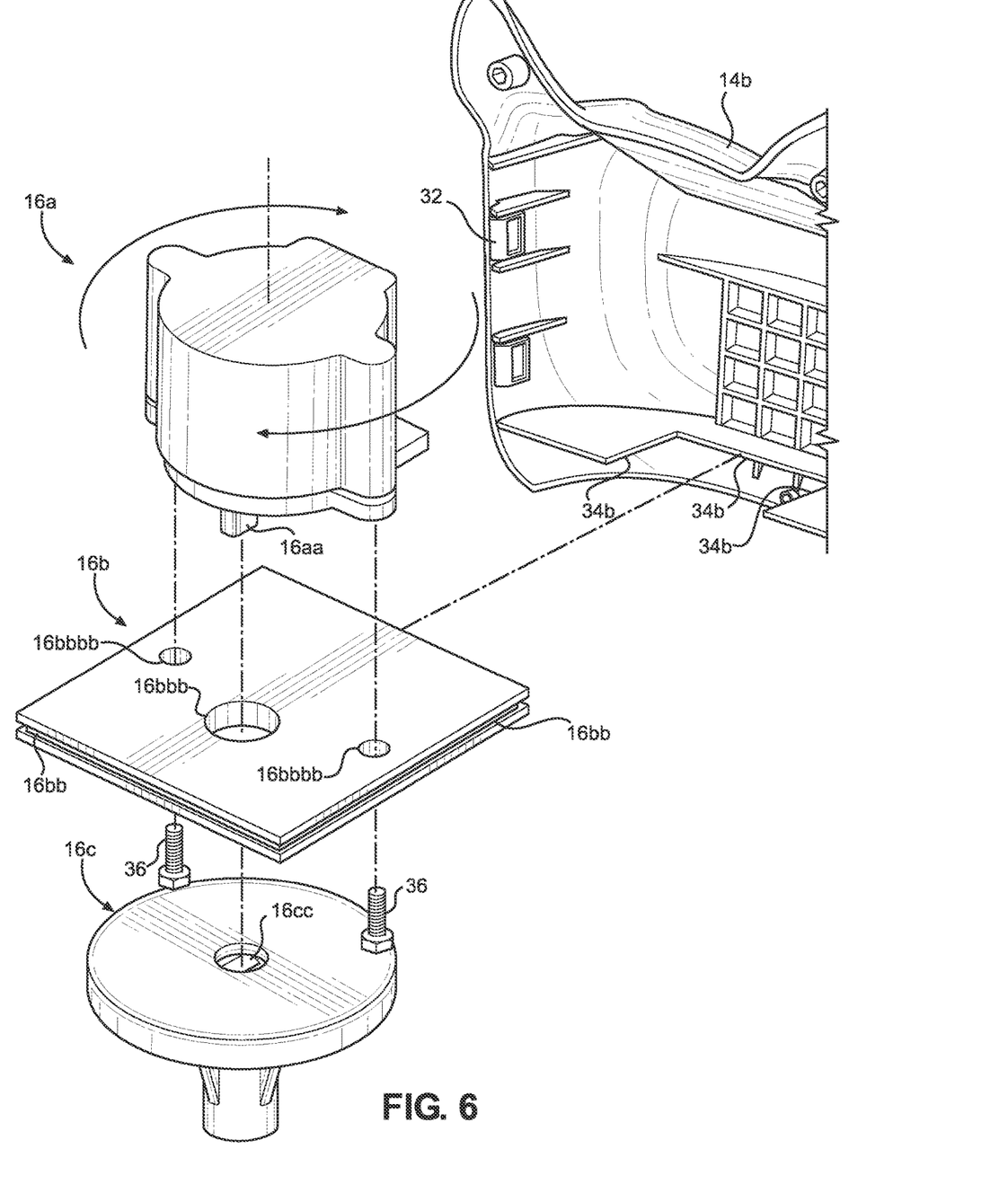
FIG. 6 is an exploded view of the motor assembly.

The mounting insert 16b includes a central aperture 16bbb through which a motor shaft 16aa passes. The mounting insert 16b also includes motor mount apertures 16bbbb through which fasteners 36 may pass to fasten to the motor 16a. For example, the fasteners 36 may be threaded fasteners and the motor 16a includes corresponding threaded apertures to receive the fasteners 36.

Figure 7:
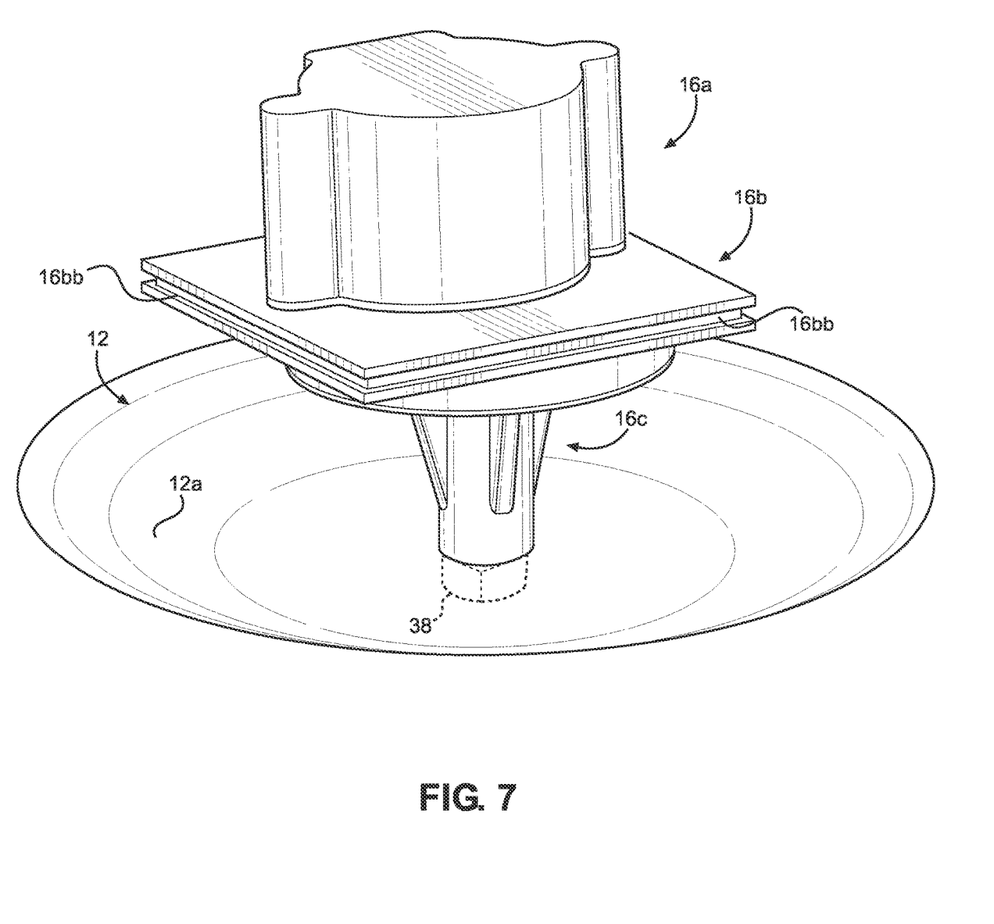
FIGS. 7 and 8 show the motor assembly attached to a scarecrow body.
Figure 8:
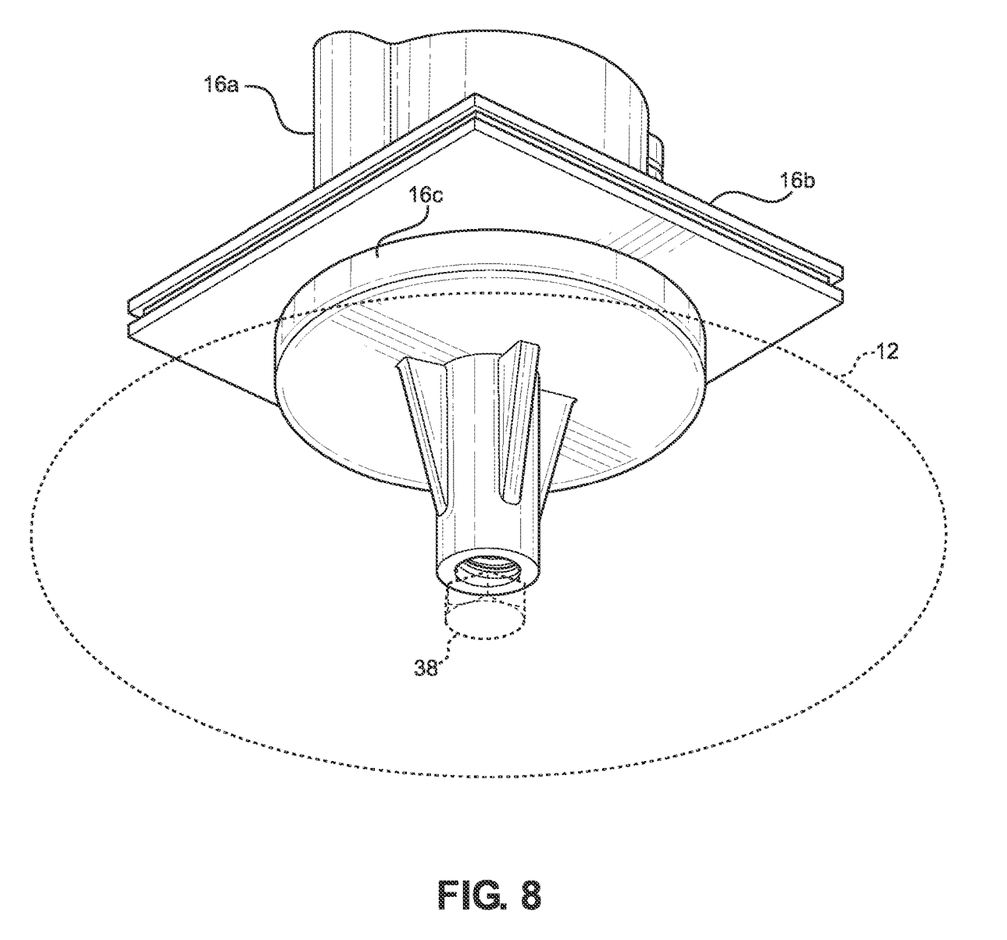
Figure 9A:
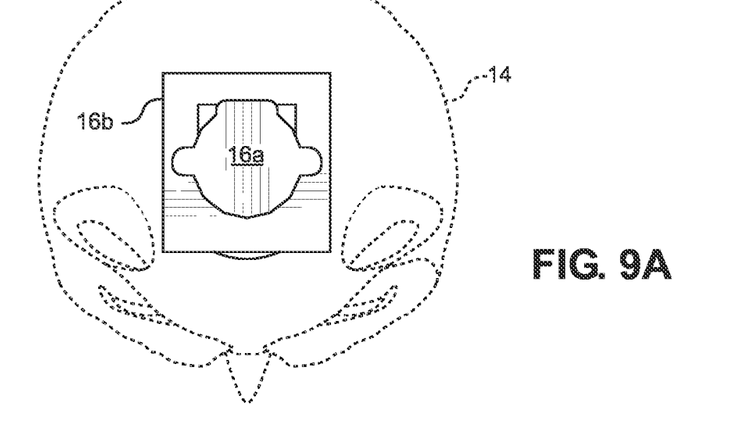
FIGS. 9A-9C and 10A-10C depict rotational movements of the head relative to the scarecrow body.
Figure 9B:
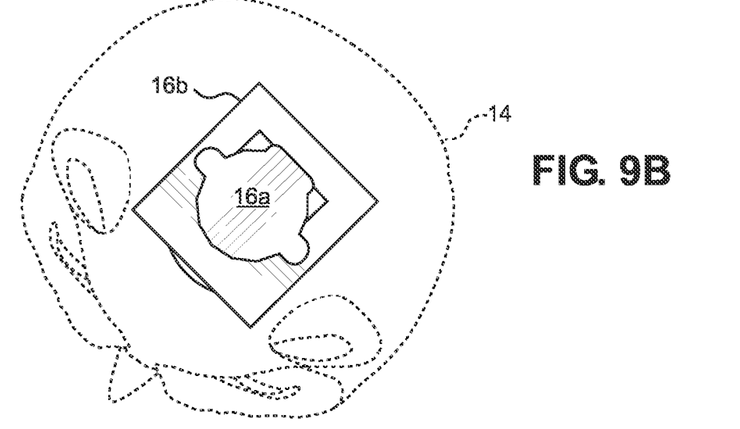
Figure 9C:
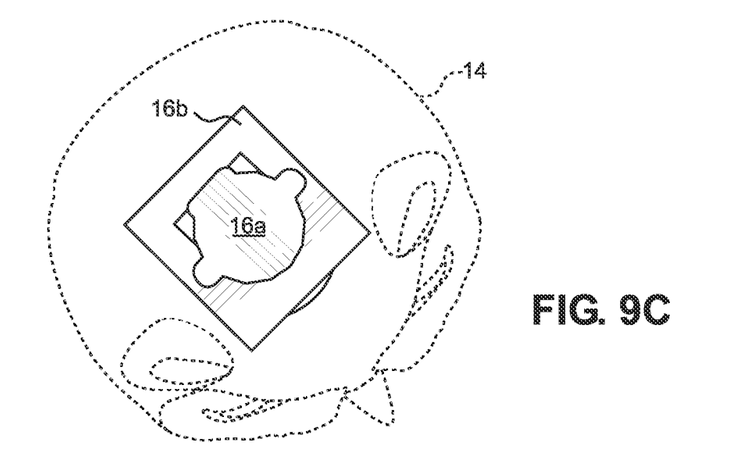

The mounting bracket 16c is configured as a pedestal to cooperate with the concave upper surface 12a of the body 12. The motor shaft 16aa of the motor 16a engages the mounting bracket 16c. The motor shaft 16aa is desirably configured to fittingly mate into a corresponding motor shaft receiver 16cc of the mounting bracket 16c. Thus, when the motor shaft 16aa is fitted to the motor shaft receiver 16cc, and the mounting bracket 16c is secured to the scarecrow body 12, operation of the motor 16a serves to rotate the motor 16a relative to the scarecrow body 12.

The mounting bracket 16c is secured to the body 12, as by a fastener 38 or adhesive or other securement to rigidly fix the mounting bracket 16c in place on the body 12. The mounting bracket 16c may also be co-formed with the body 12. The mounting bracket 16c may be installed onto the motor shaft 16aa and then the head 14 with the motor assembly 16 installed onto the body 12. Alternatively, the mounting bracket 16c may be installed onto the body 12 and then the head 14, with the motor 16a and the mounting insert 16b installed thereon, may be installed onto the mounting bracket 16 by engaging the motor shaft 16aa onto the motor shaft receiver 16cc of the mounting bracket 16c.

Because the motor 16a is fixed to the mounting insert 16b, which is fixed relative to the head 14, operation of the motor 16a serves to rotate the head 14 relative to the body 12, as depicted in FIGS. 9A-9C and 10A-10c. In this regard, the motor 16a is configured to do about ⅛ of a revolution each direction, back and forth, to move the head about 45 degrees each direction. Thus, the motor 16a is oriented so that the starting position of the shaft 16aa renders the head 14 oriented relative to the body 12 so that the head 14 is forward facing relative to the body 12.

The electronic circuit 18 and the battery 22 are desirably mounted within the rear head portion 14b, with interior surfaces of the rear head portion 14b configured to receive the electronic circuit 18 and the battery 22. It will be appreciated that the two-piece construction of the head 14 greatly simplifies installation of the electronic circuit 18 and the battery 22 into the head 14. The two-piece construction of the head 14 also facilitates replacement of the battery 22, the circuit 18, the motor 16a or other components if repair or replacement is needed.

The electronic circuit 18 and the motion sensor 20 are operative to activate the motor 16a when motion is sensed by the motion sensor. For example, should a rabbit or the like be proximate and moving near the scarecrow 10 (e.g., within 5 feet), the motion sensor 20 will sense this motion and send a signal to the electronic circuit 18. The circuit 18 will then supply power to operate the motor 16a for a determined period of time, such as a few seconds, and the motor 16a will operate to rotate the head 14 back and forth as depicted in FIGS. 9A-9C and 10A-10c to mimic the head rotation of a live owl to enhance the effectiveness of the scarecrow 10. The electronic circuit 18 may be of any design suitable for providing this desired function.

Accordingly, it will be appreciated that the disclosure provides a scarecrow having a motorized head that senses motion proximate the scarecrow. When such motion is sensed, the motor is operated to rotate the head back and forth to mimic the head movements of a live predator such as an owl. This advantageously provides a scarecrow that more realistically mimics the presence of a live owl or the like to provide a more effective scarecrow device.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A scarecrow, comprising:
   a scarecrow body corresponding generally in shape to a body of a live animal;

an assembled hollow scarecrow head of molded plastic construction corresponding in shape to a head of the live animal, the assembled head comprising a front face portion and a separate rear head portion press-fit together to form the head, the front face portion having a front receiver and the rear head portion having a rear receiver;

a motor having a rotatable motor shaft;

a mounting insert fixed to the motor with the motor shaft extending below the mounting insert, the mounting insert received by the front receiver and the rear receiver to fix the mounting insert to the head; and a mounting bracket fixed to the scarecrow body and having a motor shaft receiver into which the rotatable motor shaft is received;

wherein rotation of the motor shaft rotates the assembled scarecrow head relative to the scarecrow body.

2. The scarecrow of claim 1, wherein the head is globe shaped having a bottom opening for passage of the mounting bracket.

3. The scarecrow of claim 1, wherein the rear head portion has a rounded profile and the front face portion of the head has a flattened profile.

4. The scarecrow of claim 1, wherein the mounting insert has recessed edges received by the front receiver and the rear receiver.

5. The scarecrow of claim 1, wherein the motor is configured when operated to rotate the motor shaft about ⅛ of a revolution one direction and then in an opposite direction so that the head moves back and forth about 45 degrees in the one direction and then in the opposite direction.

6. The scarecrow of claim 1, further comprising an electronic circuit and a motion sensor located within the head and in communication with the motor to control operation of the motor and to operate the motor when motion proximate the scarecrow is sensed by the motion sensor.

7. A scarecrow, comprising:

a scarecrow body corresponding generally in shape to a body of a live animal;

an assembled head of molded plastic construction corresponding in shape to a head of the live animal, the assembled head comprising a front face portion and a rear head portion press-fit together, the front face portion having a front receiver and the rear head portion having a rear receiver;

a motor having a rotatable motor shaft; and a mounting insert fixed to the motor with the motor shaft extending below the mounting insert, the mounting insert received by the front receiver and the rear receiver to fix the mounting insert to the head.

8. The scarecrow of claim 7, wherein the head is globe shaped having a bottom opening for passage of the mounting bracket.

9. The scarecrow of claim 7, wherein the rear head portion has a rounded profile and the front face portion of the head has a flattened profile.

10. The scarecrow of claim 7, further comprising a mounting bracket mounted to a mounting surface and having a motor shaft receiver into which the rotatable motor shaft is received, wherein rotation of the motor shaft rotates the assembled head relative to the mounting surface to which the mounting bracket is mounted.

11. A method of assembling a scarecrow, comprising the steps of:

providing a front face portion and a rear head portion of a scarecrow head, the front face portion having a front receiver and the rear head portion having a rear receiver;

providing a motor assembly having a motor with a rotatable motor shaft and a mounting insert fixed to the motor with the motor shaft extending below the mounting insert;

installing the mounting insert onto either the front receiver or the rear receiver; and fitting the front face portion and the rear head portion together.

12. The method of claim 11, further comprising the step of providing a mounting bracket having a motor shaft receiver and locating the rotatable motor shaft within the motor shaft receiver.

13. The method of claim 12, further comprising a mounting surface to which the mounting bracket is mounted, wherein operation of the motor causes the head to move relative to the mounting surface.

* * * * *